United States Patent Office 3,208,870
Patented Sept. 28, 1965

3,208,870
CARBIDE COATINGS FOR GRAPHITE
Filmore F. Criss, Los Alamos, N. Mex., assignor to the United States of America as represented by the United States Atomic Energy Commission
No Drawing. Filed Dec. 31, 1956, Ser. No. 631,980
4 Claims. (Cl. 117—21)

This invention relates to methods of coating graphite with bonded layers of metal carbide and in particular to coating graphite with bonded layers of columbium or tantalum carbide.

In many uses of graphite wherein the high temperature property of the graphite is a necessary condition for its use as a material, the graphite surface does not exhibit sufficient corrosion resistant properties to be useful in the particular application. This is true, for example, where fluids move across the surface of the graphite with high volume and velocity and wear or corrode the graphite surface. This problem has been recognized in gas cooled nuclear reactors and it is important therefore that a means be found suitable for protecting the graphite surface. This protective means must also be a material which can stand high temperatures, have good mechanical properties at high temperatures and have good neutronic characteristics.

It has been found that columbium and tantalum carbide have these properties. Heretofore it has been difficult to form a surface carbide on graphite with columbium and tantalum since the characteristic behavior of these metals made it difficult to wet the graphite surface. By this invention it has been found possible to place a uniform coating of columbium or tantalum carbide on a graphite surface with a method which is easy to practice yet forms a reliable, well-bonded coating.

It is, therefore, an object of this invention to provide a means for coating graphite bodies with tenaciously bound coats of columbium or tantalum carbide.

To practice this invention an oxide of either columbium or tantalum or a combination thereof, is prepared in a powder form. The size of the powder grains is not important, however it has been found that about 200 mesh is preferable because of the ease of handling. The oxide powder is mixed with a liquid organic filler such as clear lacquer or collodion. This mixture forms a paste-like paint which can be brushed on a surface to be protected or if suitably thinned can be sprayed on the surface to be protected. After the graphite surface which is to be protected is painted with the oxide mixture, the graphite piece is placed in an atmosphere of inert gas such as argon and heated to about 2300° C. The organic filler will in part leave and in part convert to carbon which is perfectly acceptable. The columbium or tantalum oxide is reduced to columbium or tantalum metal, respectively, while simultaneously combining with the graphite or carbon to form a metal carbide.

*Example I*

To protect a graphite plate with a layer of tantalum carbide by the method of this invention 10 grams of tantalum oxide powder is prepared having a mesh size at least as small as pass 200 mesh. This powder is mixed with 10 cc. of collodion and 10 cc. of acetone to form a paste having the same consistency as a typical enamel. An ordinary paint brush is used to apply a uniform coat of oxide paint to the graphite surface and then the graphite piece is placed in a furnace in which the atmosphere is an inert gas such as argon. The piece is then heated to about 2300° C. It is not necessary to dry the paint before the piece is placed in the furnace. When the entire graphite piece has been raised to the temperature of the furnace it should be cooled to less than red heat and then may be removed from the furnace and cooled to room temperature.

*Example II*

To coat the inside of a graphite tube with columbium carbide, a powder of columbium carbide is prepared of a mesh size at least as small as pass 200. This powder is mixed with a suitable organic filler such as lacquer or collodion. A mixture of powder and filler should, in this case, be quite thin as it is desirable to coat the inside of the tube by pouring the mixture through the tube to thereby uniformly coat the inside surface. Thus the mixture is thinned with a suitable lacquer thinner, if lacquer is the filler, or with acetone or ether if collodion is the filler. If it is desired to coat the outside of this tube also, the same thin mixture may be used and the coating sprayed on the surface using ordinary spraying techniques.

There are a number of variations to this invention which are within the scope of the invention. The actual organic filler used can be selected from a variety of materials having the properties the same as or similar to lacquer. The method of applying oxide paint is not critical except that the uniformity will be reflected in the subsequent uniform coating of the carbide coating. The temperature to which the graphite painted piece is raised in order to reduce the paint to a metal carbide on the graphite surface is not critical provided the temperature is sufficiently high to decompose the paint and cause the metal to form a carbide on the graphite surface. However 2300° C. has been found to be a preferred working temperature. The size of the oxide particles is not critical, however it has been found that fine particles are easier to work with.

If it is desired to form a thicker coating of metal carbide than that given by a single treatment, the graphite piece may be recoated with the oxide paint and passed through the furnace two or more times to successively increase the thickness of the carbide coating.

The particular oxides of the metals used in the preferred embodiment of this invention are:
(1) Columbium oxide, $Cb_2O_5$,
(2) Tantalum oxide, $Ta_2O_5$.

However, it must be understood that other oxides can be satisfactorily used such as, for example, the black columbium oxide.

Therefore, the invention is not limited by the preferred embodiment or by the theory suggested, but is limited only by the appended claims.

What is claimed is:
1. A method of coating a graphite surface with a metal carbide comprising the steps of preparing a metal oxide in powder form, mixing said oxide with an organic filler selected from the group consisting of collodion and lacquer, thereby forming a paint, painting the surface of said graphite with said paint, placing said painted graphite piece in a furnace having an inert atmosphere there- in, heating said graphite piece in said inert atmosphere in said furnace to about 2300° C., said oxide selected from the class consisting of columbium oxide and tantalum oxide.

2. The method of claim 1 wherein said oxide is columbium oxide.

3. The method of claim 1 wherein said oxide is tantalum oxide.

4. A method of coating a graphite surface with a metal carbide comprising the steps of applying to said graphite surface a covering layer of a metal oxide in powder form, said oxide being selected from the class consisting of the oxides of columbium and the oxides of tantalum, and heating said oxide covered graphite surface in an inert atmosphere to a temperature of about 2300° C.

References Cited by the Examiner

UNITED STATES PATENTS

| | | | |
|---|---|---|---|
| 912,245 | 2/09 | Kuzel | 117—228 |
| 2,411,250 | 11/46 | Evans | 117—95 |
| 2,548,897 | 4/51 | Kroll | 22—200 |
| 2,822,301 | 2/58 | Alexander et al. | 117—228 XR |

OTHER REFERENCES

Handbook of Chemistry and Physics, 34th Edition, Chemical Rubber Co., Cleveland, Ohio (1952), pp. 588, 589.

RICHARD D. NEVIUS, *Primary Examiner.*

WILLIAM G. WILES, LEON D. ROSDOL, *Examiners.*